(12) United States Patent
Han et al.

(10) Patent No.: US 6,354,506 B1
(45) Date of Patent: Mar. 12, 2002

(54) METHOD AND APPARATUS FOR IMPEDING THE COUNTERFEITING OF CARDS, INSTRUMENTS AND DOCUMENTS

(76) Inventors: Wenyu Han, 5C Marten Rd., Princeton, NJ (US) 08540; Victor Zazzu, 22 Monroe Ave., Belle Mead, NJ (US) 08502

( * ) Notice: Subject to any disclaimer, the term of this patent is extended or adjusted under 35 U.S.C. 154(b) by 0 days.

(21) Appl. No.: 09/300,969

(22) Filed: Apr. 28, 1999

Related U.S. Application Data

(62) Division of application No. 09/084,844, filed on May 26, 1998, now Pat. No. 6,068,301.

(51) Int. Cl.⁷ ............................................. G06K 19/00
(52) U.S. Cl. ........................ 235/487; 235/435; 902/28
(58) Field of Search ................................ 235/375, 380, 235/381, 435, 445, 454, 458, 487, 489, 492, 493, 494, 475, 440, 441, 449, 479; 902/28; 283/72, 74, 76, 86, 901

(56) References Cited

U.S. PATENT DOCUMENTS

| | | | | |
|---|---|---|---|---|
| 3,676,644 A | * | 7/1972 | Vaccaro et al. | 235/493 X |
| 4,013,894 A | * | 3/1977 | Foote et al. | 235/487 X |
| 4,025,759 A | * | 5/1977 | Scheffel | 235/487 X |
| 4,141,044 A | * | 2/1979 | Kistner et al. | 235/380 |
| 4,507,550 A | * | 3/1985 | Fleer | 235/493 X |
| 4,621,188 A | * | 11/1986 | Stockburger et al. | 235/487 X |
| 4,630,845 A | * | 12/1986 | Sanner | 283/91 |
| 4,649,265 A | * | 3/1987 | Stockburger et al. | 235/493 X |
| 4,675,669 A | * | 6/1987 | Goldman | 235/487 X |
| 4,745,267 A | * | 5/1988 | Davis et al. | 235/479 |
| 4,800,258 A | * | 1/1989 | Suzuki et al. | 235/479 |
| 4,897,531 A | * | 1/1990 | Someya et al. | 235/440 |
| 4,914,279 A | * | 4/1990 | Massey | 235/449 |
| 5,319,476 A | * | 6/1994 | Yamazaki et al. | 283/86 X |
| 5,354,097 A | * | 10/1994 | Tel | 283/72 |
| 5,491,326 A | * | 2/1996 | Marceau et al. | 235/381 |
| 5,559,885 A | * | 9/1996 | Drexler et al. | 235/380 |
| 5,770,846 A | * | 6/1998 | Mos et al. | 235/440 |
| 6,179,211 B1 | * | 1/2001 | Green et al. | 235/493 |

FOREIGN PATENT DOCUMENTS

JP 1-190482 A * 7/1989

\* cited by examiner

*Primary Examiner*—Michael G. Lee
*Assistant Examiner*—Jared J. Fureman

(57) ABSTRACT

To impede the counterfeiting of a valuable instrument (e.g., a cash card, negotiable instrument or any document), an issuance mark is formed on the instrument at a programmed distance from a reference mark located on the instrument. The information pertaining to the distance is encoded and written onto a storage medium located in the instrument. In a particular system embodying the invention, a card vending machine is programmed to encode cards with various parameters, such as the distance between the reference and issuance marks, by writing the parametric information into an information storage medium located in the card. As a corollary, in a particular system embodying the invention, a dispensing machine is programmed to read the information stored in the information storage medium and the parametric information present in the card and to then compare the stored information with the values of the actual parameters present in the card.

63 Claims, 5 Drawing Sheets

METHOD AND APPARATUS FOR IMPEDING THE COUNTERFEITING OF CARDS, INSTRUMENTS AND DOCUMENTS

This is a division of application Ser. No. 09/084,844 filed May 26, 1998, now U.S. Pat. No. 6,068,301.

BACKGROUND OF THE INVENTION

This invention relates to valuable cards, instruments and documents and, in particular, to a method and apparatus for preventing the counterfeiting and falsification of these cards, instruments and documents.

For ease of discussion, the invention will be illustrated using cards, such as debit cards (or cash value cards) which are issued to individuals in payment of a certain sum of money. These debit cards are also referred to as cash value cards or cash cards since they may be redeemed for cash or the equivalent in goods and/or services. In fact, a card holder uses the card when making withdrawals at a money dispensing or card acceptance machine. By way of example, as shown in FIG. 8A, a person may insert cash ($) into a card vending machine 95 and the card vending machine will issue a debit or cash value card 100. Subsequently, as shown in FIG. 8B, the purchaser of the card can insert the card 100 into a cash dispensing (card accepting) machine 97 to withdraw all or part of the cash value of the card 100.

In one application, each time the card holder makes a withdrawal, a hole is punched through the card to indicate the amount of the withdrawal. For example, assume that a card issued for payment of $2,000.00 has a value of $2,000.00 and that the $2000.00 card is arranged to have 20 units with each unit representing a value of $100.00. A card holder may then make partial cash withdrawals (receive payment) in units of $100.00, or the card holder may receive goods (e.g., tokens, chips, balls) or services meted out in units of $100.00. For each unit (e.g., $100.00) withdrawn, a hole is punched in the card to indicate that the value of the card has been decreased by one unit (e.g., $100.00). If a card has a value of 20 units, there can be a maximum of 20 unit holes punched in the card to indicate that the entire value of the card has been used up.

By way of example, a card 100 is shown in FIG. 1. The card has a strip 102 along which holes may be punched. Typically, as shown in FIG. 1, an issuance hole 1A is punched into the card by the card vending machine 95 at the time of the issuance of the card so as to validate the card. Subsequently, 20 additional holes (2–21) may be punched into the card by the cash dispensing machine 97 each time a withdrawal is made. Hole number 2 is punched into the card after the first unit value is used up (e.g., $100.00 is withdrawn). Subsequently, hole number 3 is punched into the card after the second unit value is used up (e.g., another $100.00 is withdrawn), and so on. Thus, if the card holder used up the 20 units of value on the card by making 20 individual withdrawals, there would be a hole at each of twenty positions, plus an additional card issuance hole for a total of twenty one holes. In some prior art applications, if the card purchaser used up two units at a single transaction, there would be a single hole at the two unit position. Likewise, if the card used up twenty units in a single transaction, there would be a single hole at the 20 unit position. In any event, in accordance with the prior art, one or more holes are punched into a cash card until all the holes are punched or until the last hole (unit 20) is punched.

A problem with the above scheme is that it is possible to falsify the value of the card by simply filling in the holes of the cards using an opaque material. After the holes in the card have been filled up, the counterfeiter (thief) can reuse the card as if it were new and make cash (or the equivalent) withdrawals for the full value of the underlying card. The counterfeiter can then reuse the card an indefinite number of times.

It is known to deter the efforts of a counterfeiter (or falsifier) by manufacturing the cash cards 100 with a hologram stripe 101 on which is formed a holographic type of image in the same plane as the one in which the holes are to be punched, as shown in FIG. 2. For such cards, the holes simply cannot be filled up by conventional methods to fool a dispensing machine. If there is a hole in the holographic image, it becomes very difficult, if not impossible, for a counterfeiter to fill up the hologram image without using some very expensive methods. Nevertheless, it is still possible for a counterfeiter to reuse a canceled card by cutting off a portion of the top of the hologram stripe (e.g., section 101A) above the holes; and then pasting the portion of the hologram stripe (101A) on the portion (101B) of a previously canceled card so that the holes are covered. Alternatively, a counterfeiter may produce a false hologram to place over a strip 101 even though its placement in an appropriate manner so as to fool a dispensing machine presents a significant problem. In either method, the counterfeiting process is then normally completed by punching an issuance hole in the first position (i.e., the card issuance position).

An object of the invention is to make the falsification of the value of a cash card or the counterfeiting of such cards extremely difficult, if not impossible.

As noted above, the cash card is an example of a particular application of the invention. It is an object of the invention to impede the counterfeiting and/or falsification of any valuable instrument/card/document. Therefore, note that in the discussion to follow and in the appended claims, when the term "instrument" is used without limitation, it is intended that the term "card" or "document" be included and vice-versa.

SUMMARY OF THE INVENTION

In systems embodying the invention, a card, instrument or document is encoded with first and second marks with the distance between the first mark and the second mark being programmable, such that the distance between the first mark and the second mark may be different for different cards (instruments or documents). The first mark may be a reference mark and the second mark may be an issuance mark. In the discussion to follow, the issuance mark used in the embodiments is an "issuance hole". However, it should be understood that, in practicing the invention, any suitable "issuance mark" may be used instead of an issuance hole.

In some embodiments, the location of the issuance hole may be selected to be placed anywhere on a card. In other embodiments, the location of the issuance hole may be any one of "N" possible hole locations located along a row or strip of a card; where N may be any integer greater than one.

The reference mark may be any number of different indicia and may be formed such that different points, or parts, of the reference mark may be used as the reference point to measure the distance to the issuance hole.

In certain embodiments, the reference mark is a hologram. In other embodiments, the reference mark is a bar code image (which may be visible or invisible to the naked eye). In still other embodiments, the reference mark may be a graphic image. In still other embodiments, the reference mark may be a "reference" hole.

In certain embodiments of the invention, the cash cards include a magnetic strip on which is written encoded information pertaining to the relationship between the reference mark and the issuance hole.

In systems embodying the invention a card vending machine may be programmed to locate (or form) a reference mark on a card and to form an issuance mark on the card at different distances relative to the reference mark. The information relating to the distance is encoded (encrypted) and stored in an information storage medium (e.g., a magnetic stripe) located on the card.

Subsequently, a user may use the card containing the reference and issuance marks to obtain either cash, goods or services from a dispensing machine programmed to read and decode the information stored in the storage medium.

BRIEF DESCRIPTION OF THE DRAWINGS

In the accompanying drawings, like reference characters denote like components.

DESCRIPTION OF THE INVENTION

In order to counter attempts to counterfeit or falsify the value of a debit card (cash card), applicants developed a system to render attempts to counterfeit or falsify the debit cards extremely difficult and/or inordinately expensive, if not impossible.

Figure 9A:
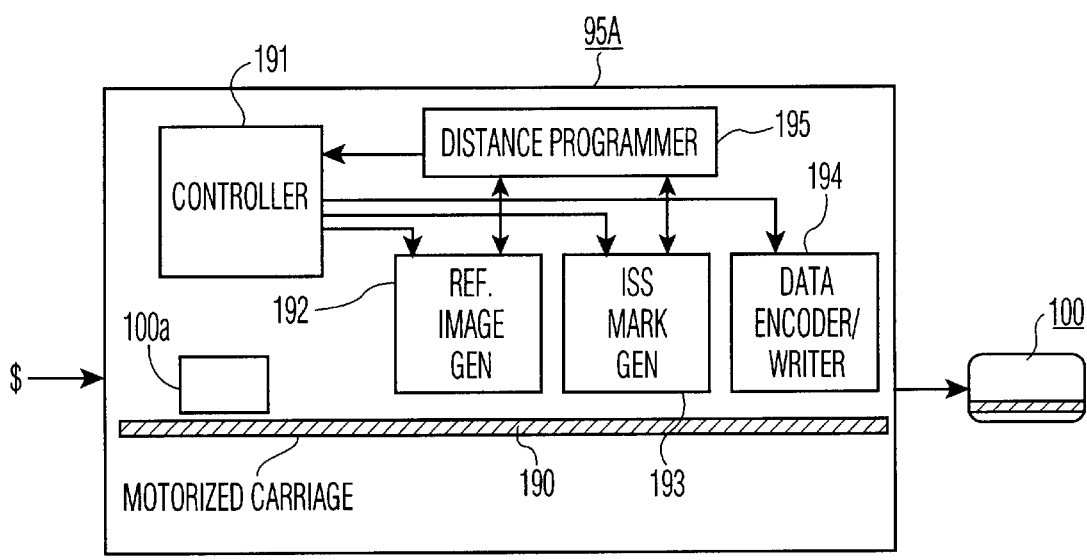
FIG. 9A is a simplified block diagram of a portion of a card vending machine modified in accordance with the invention.

In order to produce cards in accordance with the invention, the prior art vending machine may be modified as shown in FIG. 9A. Thus, in FIG. 9A, a "blank" card (a card to be annotated) 100a is propagated along a motorized carriage 190 through the machine 95A. The machine includes a microcontroller 191 which supplies critical signals to a reference image (mark) generator 192, an issuance mark generator 193 and a data encoder and writer 194. Under the control of controller 191, the reference mark generator 192 places a reference mark, whose shape may also be controlled and programmably altered, onto the card. The issuance mark generator 193 then places an issuance mark on the card of a shape and at a location programmably controlled by controller 191. The distance "d" between the reference mark, or an arbitrary point on the reference mark, and the issuance mark is then determined by the controller 191. The controller 191 includes, in combination with a data encoder and writer 194, means for encoding the data and then writing the encoded information onto the card.

In accordance with the invention, the controller 191 may be programmed to vary the shape and location of the reference mark. Likewise, the controller 191 may be programmed to vary the location of the issuance mark relative to the reference mark. The spacing (distance) between the reference and issuance marks may be sensed by the distance programmer 195 coupled to the controller 191 which then decodes the information and supplies it to data writer 194. The controller may also be programmed to vary the shape of the reference mark to further increase the difficulty of counterfeiting the mark. The reference and/or issuance marks may be: holes punched in the card; graphic symbols engraved or burned into the card; holographic images; or any other indicia which is machine readable or which may be rendered machine readable.

Figure 9B:
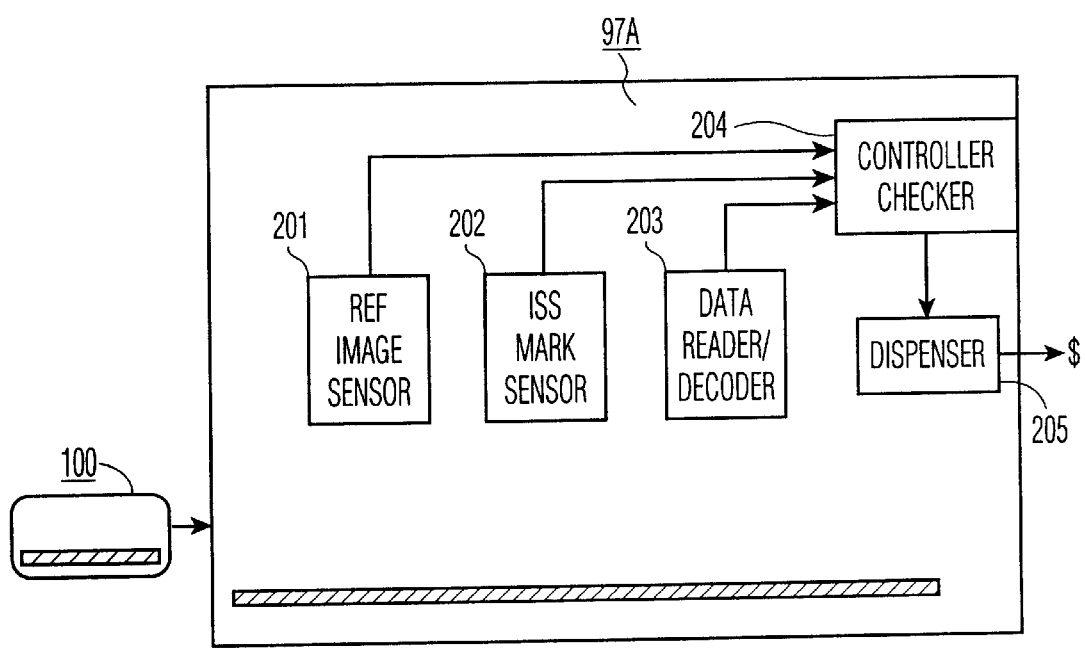
FIG. 9B is a simplified block diagram of a portion of a vending machine modified in accordance with the invention.

In order to read or sense the cards embodying the invention, the dispensing (card accepting) machine may be modified as shown in FIG. 9B. As shown in FIG. 9B, the dispensing machine 97A includes a sensor 201 to sense the reference mark location, a sensor 202 to sense the location of the issuance mark and a data reader (decoder) 203. Sensors 201 and 202, and reader/decoder 203 are coupled to a controller/checker 204. Typically, when a card is inserted into dispenser 97A, the reader/decoder 203 reads (senses) the stored information written in a magnetic strip (or other storage medium) located on the card. This information is decoded and the controller 204 is provided with the information about the shapes of the reference and issuance marks and the distance between these marks. The reference mark sensor 201 senses information regarding the location and shape of the reference mark which it senses and feeds this information to the controller. Likewise, the issuance mark sensor 202 senses information regarding the location and shape of the issuance mark which it sees and feeds this information to the controller 204. The controller 204 evaluates the information received from sensors 201, 202 and 203 and compares the received information to the information received from reader/decoder 203. If the information matches, controller/checker 204 signals the dispenser to issue cash, goods or services. If the information does not match, controller/checker 204 will send an alarm indicative of the presence of a false card.

Figure 1:
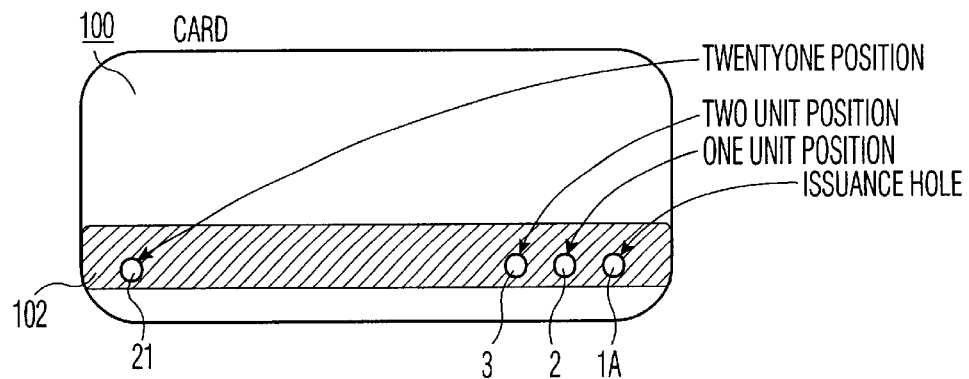
FIG. 1 illustrates one side of a cash (value) card.
Figure 2:
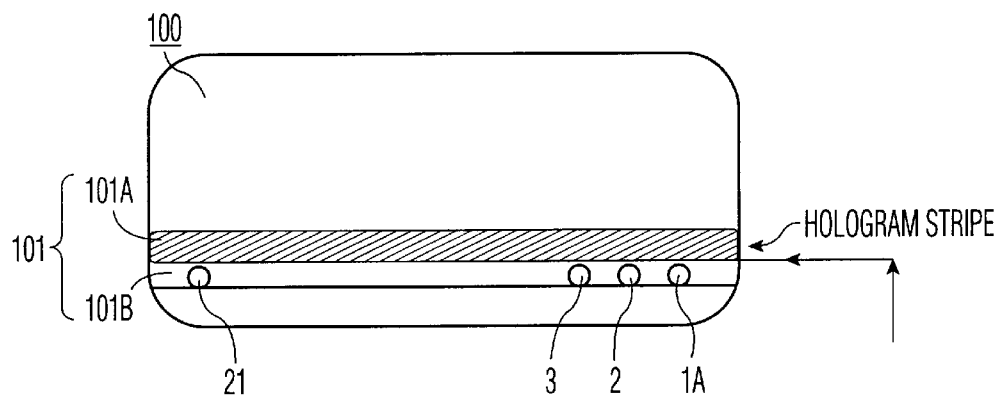
FIG. 2 shows the one side of a cash card with a hologram stripe and a row of punched holes.

In accordance with one embodiment of the invention, the location of the issuance hole is programmed to be placed in any one of N predetermined positions on a card such as shown in FIGS. 1 and 2, where the N holes will be punched along the strip 102 or 101 and N is any integer greater than one. For example, there may be 20 possible locations for punching cancellation holes in the card and one location for punching the card issuance hole. That is, in accordance with the invention, a card vending machine such as 95A in FIG. 9A may be programmed to locate the issuance hole in any one of 21 possible positions. The location of the issuance hole is then encoded (encrypted) by the vending machine and then written (stored) by the machine onto a magnetic stripe (see FIG. 6) or any suitable storage medium located on the card, as shown, for example, in FIG. 6A discussed below. Therefore, for the example of a card with 20 possible hole locations and one issuance hole location, the card issuance hole may be located in any one of twenty one positions. This reduces the odds of a counterfeiter getting the issuance hole in the correct position to 1 in 21.

In accordance with another embodiment of the invention, in the manufacturing of the debit cards, there is a holostripe placed on the cards as shown in FIG. 2. Contained within this holostripe is an image that is detectable by machine readable means. Since the cards are made on a mass production basis, it is difficult for the card manufacturer to accurately register the edge of the holostripe to the card edge. An aspect of the present invention is to use the inherent randomness of the manufacturing process in which the holostripe is randomly placed on the card to effectively deter any attempts to counterfeit the card. Since the holographic image located in the holostripe has a finite size and a definite start of image characteristic, the random location of the hologram image is used to calculate and to then store on the card the information pertaining to the location of the card issuance hole.

Figure 3:
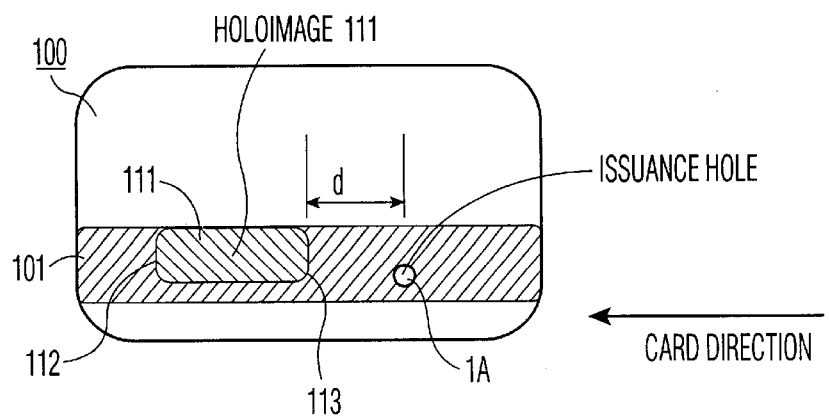
FIG. 3 shows the one side of a cash card with a holographic image formed within the hologram stripe.

FIG. 3 shows a holographic image (holoimage) 111 and an issuance hole 1A located a distance "d" from the back edge 113 of holoimage 111. At the time the card is issued to a purchaser, it is passed through a vending machine 95A, as shown in FIG. 9A, which includes a motorized carriage for moving the card through a reader (or like sensor) at a constant speed. During this operation, the vending machine 95A, modified in accordance with the invention, includes sensing and logic circuitry and the appropriate software to very accurately calculate the distance "d" between the beginning (or some other predetermined point) of the holographic image 111 and the location where the issuance hole is punched (which can be located in any one of N, e.g., 21, positions). The distance measurement is then written (encoded) together with additional information onto the magnetic stripe (or any other suitable storage medium) located on the card for future verification. If the counterfeiter cuts a stripe from an existing card and attempts to cover the existing holes on a previously canceled card, it will be impossible for the counterfeiter to exactly duplicate the holoimage position. If the new stripe is positioned such that the issuance hole of the "falsified" card is at a distance other than "d" from the selected point on the reference mark, the accurate measurement calculations between the image 111 and the issuance hole 1A will not match the condition set by the vending machine issuing the card. In addition, where the issuance hole is algorithmically defined to be one of N (e.g., 21 or more) locations, it is very difficult to identify which hole is the issuance hole.

Figure 4:
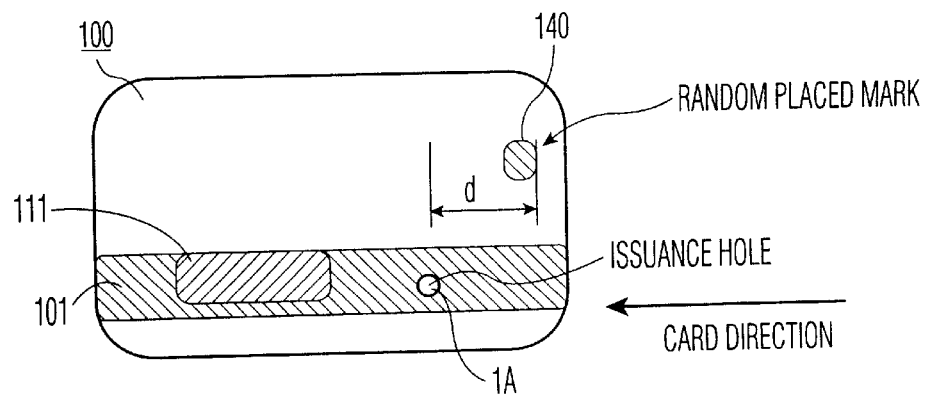
FIG. 4 illustrates one side of a cash card with a reference mark used to define the location of an issuance hole.

In still another embodiment of the invention, as shown in FIG. 4, the issuance hole 1A is located at a distance "d" from a random indicator mark 140, which may be a hole punched into the card or any other suitable marker or indicia. In this instance, no reliance is made on the holographic image 111 or stripe to locate the issuance hole 1A.

Figure 6:
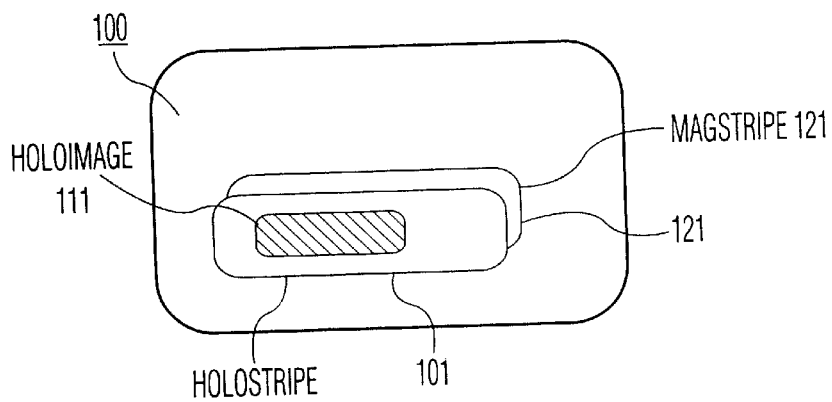
FIG. 6 illustrates one side of a cash card on which is formed a holostripe on top of a magnetic stripe.
Figure 6A:
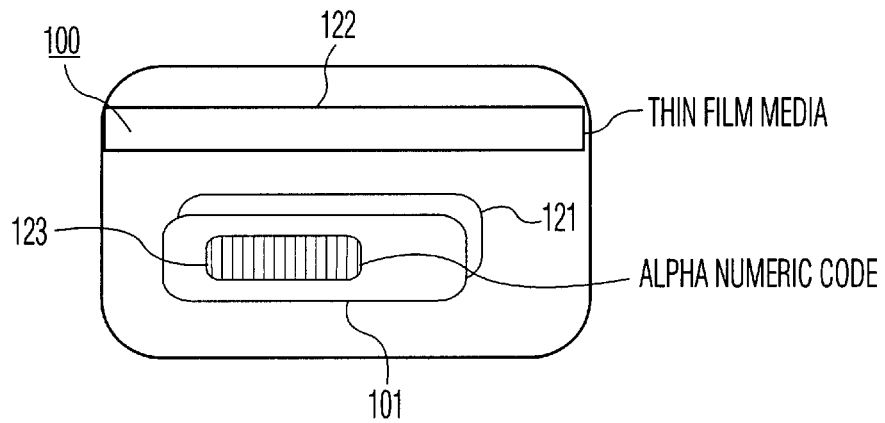
FIG. 6A illustrates the use of different storage mediums on a card.

In systems embodying the invention, information pertaining to the distance "d" between a reference mark and an issuance mark is stored in a storage medium located on the card, as shown, for example, in FIGS. 6 and 6A. Also, any pertinent parameters and information regarding the reference mark and/or the issuance mark may be stored in the information storage medium. In FIG. 6, the information storage medium is a magnetic stripe. As shown in FIG. 6, cards embodying the invention may include a holostripe 101 containing a holoimage 111 and a magnetic stripe 121. The magnetic stripe may be formed immediately below the holostripe or it may be formed adjacent to the holostripe, on the same side of the card, or the magnetic stripe may be formed on the side of the card opposite to the side on which the holostripe is formed. In FIG. 6A, the storage medium is a thin film 122 on which may be formed semiconductor devices to electronically store information. Another information storage medium, shown in FIG. 6A, is a strip 123 on which may be printed an alphanumeric code. It should be noted that the dispensing machines 97A will include reading systems capable of reading the information stored in the cards.

As part of the system to make the cards more secure (i.e., more difficult to falsify or counterfeit) information is encoded (written in code) on the magnetic stripe. For example, when one card is issued from vending machine 95A, the distance "d" in FIGS. 3, 4 or 5 may have a first value (e.g., 0.5 inches) for one card. This value (information) is encrypted in the magnetic stripe of that card. When another card is issued by the card dispensing machine, the distance "d" in FIGS. 3, 4 and 5 may have a second value (e.g., 0.6 inches). By varying the distance "d", the location of the issuance hole has been "randomized". Furthermore, its location on the card can only be determined by ascertaining which "indicium" or "marker" the issuance hole is referenced to. In FIG. 3, the issuance hole is referenced to some point associated with holographic image 111. That point, for example, may be the beginning or the end or some intermediate bar of holographic image 111.

In FIG. 4, the random mark 140 may be, for example, a hole or an image of some animal or fruit. If an animal, such as a horse with 4 legs is used, the distance "d" may be referenced to any one of the 4 legs of the horse or to any other suitable point on the animal.

Figure 5:
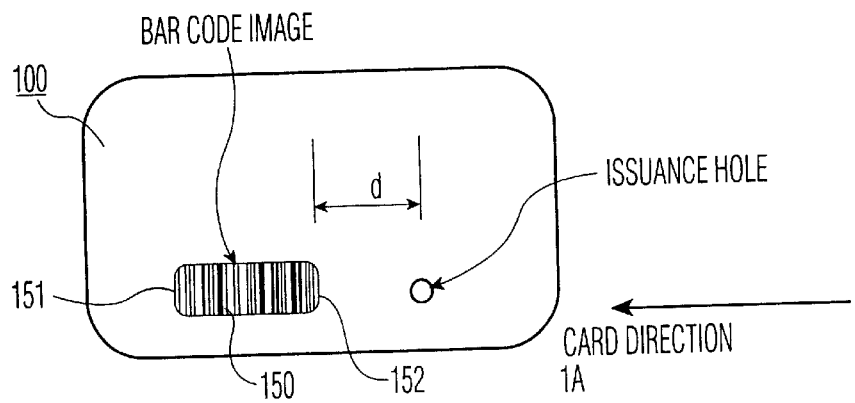
FIG. 5 illustrates one side of a cash card with a bar code used to define the location of an issuance hole.

Likewise, in FIG. 5, the issuance hole is referenced to a bar code image 150. The location of the issuance hole may be located at a distance "d" relative to any one of a number of different bars of the bar code. The distance "d" may vary and the bar or space on the bar code being used as a reference may vary. Thus, a counterfeiter or falsifier of a card must be able to solve these additional problems in order to reuse a canceled card (or a partially used card) or to produce another card which when inserted into a dispensing machine 95B will be recognized as a valid card.

Applicants' invention is also applicable to instances where a counterfeiter becomes able to "exactly" duplicate debit cards. This can conceivably occur where a counterfeiter stole a debit card vending machine. Such machine would include a "correct" or valid hole punching algorithm. Accordingly, the cards dispensed from a stolen vending machine would contain the correct hole punching algorithms and would pass the security system outline. To counter this problem, each vending machine 95A may be manufactured with a unique electronic serial number. That serial number will be written to the storage medium (e.g., magnetic portion) of the card. However, once the theft of the "valid" machine is detected, the serial number of a stolen machine can then be electronically downloaded to all of the cash dispensing machines. The cash dispensing machines will then cross-check the vending serial number against the downloaded information to prevent pay out on a "counterfeit" card.

Figure 7:
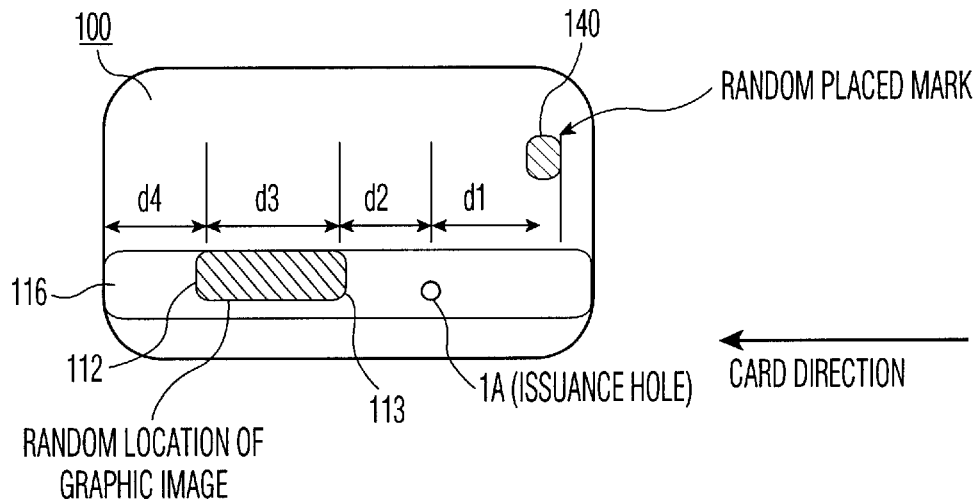
FIG. 7 illustrates one side of a cash card and different points which may be used to locate the issuance hole.
Figure 8A:
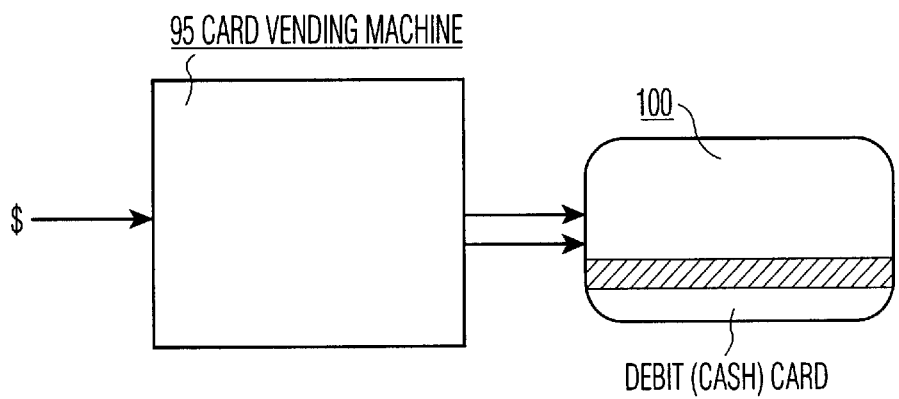
FIG. 8A is a very basic block diagram of a card vending (card producing) machine.
Figure 8B:
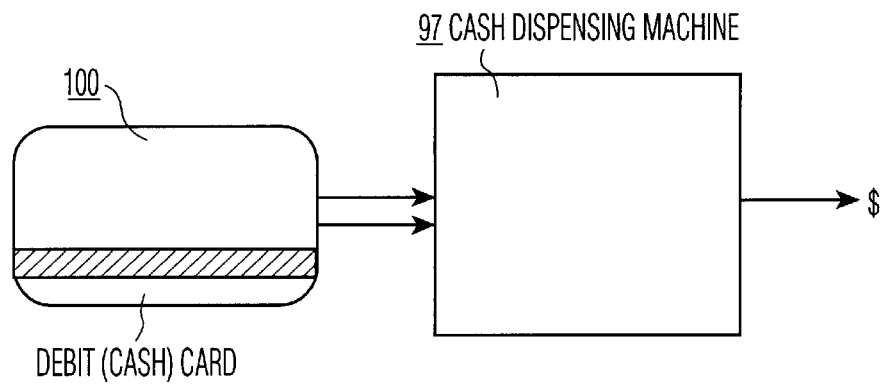
FIG. 8B is a very basic block diagram of a cash dispensing (card accepting) machine.

FIG. 7 is designed to illustrate that the distance measurements from the issuance hole 1A may be referenced to either one of the following points:
(a) the front edge of the card 116 (distances d3+d2+d4); or
(b) the front edge 112 of the holographic image 111 (distances d3+d2); or
(c) the back edge 113 of the holographic image 111 (distance d3); or
(d) any intermediate point along the hologram; or
(e) the randomly placed mark or hole 140 (distance d1); or (f) any permutation or combination of distances d1, d2, d3 and d4.

The card vending machine 95A is programmed to determine which one of the measurements (or the combination of measurements), shown in FIG. 7, are used to define the issuance hole and the reference mark. The card vending machine is also programmed to code the information and to generate a cryptogram containing the information. The encrypted (encoded) information is then written into and/or onto the magnetic stripe (or any other storage medium located on the card) and the issuance hole is punched on the card.

Card vending machine 95A includes a carriage driven by a motor to advance the card along a path. The gear rotation of the motor may be used to determine the distances between the reference and the issuance marks. Alternatively, vending machine 95A may include an electronic timer (not shown) or any other suitable system which can be used to determine the various distances.

Cards, which may be of the plastic type in common use, have been used by way of example to illustrate the application of the invention. It should be appreciated that the invention may be used with other materials such as specially treated paper (similar to travelers checks or any like negotiable instrument) or any document (e.g., a passport). Therefore, in the appended claims reference to an instrument is intended to mean any item of manufacture or any document (e.g., a passport) suitable for the placing thereon of a (e.g., first) reference mark and an issuance (e.g., second) mark in accordance with the invention.

As noted above the issuance hole is used by way of example and any "issuance mark" may be used. That is, the issuance mark may be formed by a laser beam or by a heating element or by any other suitable means to indicate, or form, an issuance mark (e.g., second mark) at a programmable distance from a reference mark (e.g., first mark) and which "issuance mark" can be read or sensed by a suitable electronic or electro-optic sensor.

Regarding the reference mark, a "blank" card may come formed or prepared with a reference mark, in which case, the "vending" machine would first identify its location before forming an issuance mark. Alternatively, if a blank card does not contain a reference mark, the vending machine will form and locate a reference mark by using the reference mark generator as discussed above.

The invention has been illustrated using a "reference mark" and an "issuance" mark. However, it should be appreciated that any "first" and "second" marks may be used.

What is claimed is:

1. A method for impeding the falsification of an instrument comprising the steps of:
   propagating the instrument along a motor driven carriage, where the motor is operated at a predetermined rate;
   locating a first optical mark formed on said instrument;
   selectively defining the location of an initial second mark on said instrument at a distance "d" from said first mark;
   selectively defining the location of a "new" second mark at a different location than that of the initial second mark during the period of time that the instrument is propagated along the motor driven carriage;
   measuring the distance "d" between the first and second marks as a function of the rate of movement of the motor; and
   encoding the information relative to the distance "d" in an information storage medium located on said instrument each time the instrument is propagated along the carriage.

2. A method as claimed in claim 1 wherein the information storage medium is one of a magnetic stripe and a semiconductor storage device.

3. A method as claimed in claim 1 wherein said first mark is a reference mark and said second mark is an issuance mark, and wherein said first mark is formed on the instrument prior to the propagation of said instrument along the motor driven carriage; and wherein selectively defining the location of the second mark occurs after the first mark is formed and during the period the instrument is propagated along the carriage.

4. A method as claimed in claim 3 wherein the step of forming an issuance mark includes the step of forming an issuance hole in said instrument.

5. A method as claimed in claim 1, wherein the first mark is a reference mark and wherein the step of locating a reference mark includes the step of forming a reference mark at that location.

6. A method as claimed in claim 1 wherein said instrument is a card.

7. A method as claimed in claim 1 wherein said instrument is a document.

8. A method as claimed in claim 1 further including the step of checking the validity of an instrument by sensing the distance between the first and second marks and comparing the results versus the encoded information.

9. A method as claimed in claim 8 wherein said second optical mark has a plurality of different points, and wherein subsequent to checking the validity of an instrument the method further includes the steps of: (a) selecting a new point along the second mark; (b) measuring the new distance between the first mark and the new point on the second mark; and (c) encoding the information pertaining to the new distance in the information storage medium.

10. Apparatus for reading an instrument comprising:
    a data reader for reading information stored in an information storage medium located in said instrument;
    a motor driven carriage for propagating the instrument at a predetermined rate along the apparatus;
    a sensor circuit for sensing the location of a first optical mark present on said instrument and the location of a second optical mark present on said instrument; said sensor circuitry including means responsive to the movement of the carriage for determining the distance between the first and second marks;
    controller circuitry adapted to receive information from said data reader and from said sensor circuit for comparing the information from said data reader with the information received from said sensor circuit; and
    wherein said controller circuitry includes: (a) means for determining the distance between two selected marks; (b) means for determining whether the determined distance corresponds to the value stored in the information storage medium; (c) means for defining a new distance between the first and second marks by selecting a new point on one of the first and second marks; and (d) encoding information pertaining to the new distance in the information storage medium.

11. An apparatus as claimed in claim 10 wherein said instrument includes an information storage medium in which is stored information pertaining to the distance between the first and second marks; and wherein said data reader is designed to sense the information stored in the information storage medium.

12. An apparatus as claimed in claim 11 wherein said first mark is a reference mark and wherein said second mark is an issuance mark and wherein said sensor circuit includes a reference mark sensor for sensing said reference mark and an issuance mark sensor for sensing the location of said issuance mark relative to said reference mark.

13. An apparatus as claimed in claim 11 wherein said instrument is one of a document and a cash value card.

14. An apparatus for encoding an instrument to impede its being counterfeited comprising:
   a motor driven carriage for propagating the instrument at a predetermined rate along the apparatus;
   generator circuitry for locating a first mark on said instrument and for selecting a second mark on said instrument, during the time the instrument is propagated along the apparatus, at a programmable distance from said first mark, wherein at least one of said first and second marks has a plurality of different points; and
   a data write circuit for programmably selecting different points on one of said first and second marks for defining a new distance between the first and second marks and for storing in an information storage medium, located in said instrument, information pertaining to the new distance between said first and second marks.

15. An apparatus as claimed in claim 14 wherein said first mark is a reference mark and said second mark is an issuance mark, and wherein said generator circuitry includes a reference mark generator circuit for forming said reference mark on said instrument and an issuance mark generator circuit for forming said issuance mark on said instrument.

16. An apparatus for encoding an instrument as claimed in claim 15 wherein said data write circuit, said reference mark generator and said issuance mark generator include controller circuitry for selectively setting the distance between a reference mark and an issuance mark and for encoding the information pertaining to the distance and then causing the information pertaining to the distance to be written on the instrument.

17. An apparatus as claimed in claim 16 wherein said instrument is a card.

18. Apparatus for sensing information and marks on an instrument to be inserted in said apparatus, comprising:
   a motorized carriage within the apparatus driven by a motor for propagating the instrument within and through the apparatus;
   a data reader in said apparatus for reading information stored in an information storage medium located on said instrument;
   a sensor circuit in said apparatus for sensing the location of the presence of a first mark on said instrument and the location of the presence of a second mark on said instrument; and
   controller circuitry within said apparatus responsive to the information from the sensor circuit for determining the distance between the first and second marks as a function of the movement of the carriage propagating the instrument and adapted to receive information from said data reader and from said sensor circuit for comparing the information from said data reader with the information received from said sensor circuit said controller circuit also including means for selectively altering at least one of the shape and location of one of said first and second marks on said instrument.

19. An apparatus as claimed in claim 18 wherein said information storage medium located on said instrument includes information pertaining to the distance between the first and second marks; and wherein said data reader is designed to sense the information stored in the information storage medium.

20. An apparatus as claimed in claim 19 wherein said first mark is a reference mark and wherein said second mark is an issuance mark and wherein said sensor circuit includes a reference mark sensor for sensing said reference mark and an issuance mark sensor for sensing the location of said issuance mark relative to said reference mark.

21. An apparatus as claimed in claim 19 wherein said instrument is one of a document and a cash value card.

22. An apparatus as claimed in claim 19 wherein said instrument is a document.

23. An apparatus as claimed in claim 18 wherein at least one of said first and second marks has a multiplicity of points and wherein said controller circuit also including means for selectively altering at least one of the shape and location of one of said first and second marks on said instrument includes generator circuitry in said apparatus for locating the first mark on said instrument and for selecting a point on the second mark of said instrument at a programmed distance from said first mark, said generator circuitry for selectively modifying the point selected on said second mark subsequent to the insertion of the instrument within the apparatus; and
   a data write circuit for storing in the information storage medium, located within said instrument, new information pertaining to the distance between said first and second marks.

24. An apparatus as claimed in claim 18 wherein said controller circuit also including means for selectively altering at least one of the shape and location of one of said first and second marks on said instrument includes generator circuitry in said apparatus including means for locating the first mark on said instrument and for selecting, on said instrument, a second mark at a location other than said first mark, said generator circuitry for modifying the instrument subsequent to the insertion of the instrument within the apparatus; and
   a data write circuit for storing in the information storage medium, located within said instrument, new information pertaining to the distance between said first and second marks.

25. An apparatus as claimed in claim 24 wherein at least one of said first mark and said second mark has a plurality of different points, and wherein said generator circuitry includes a reference mark generator and an issuance mark generator for for selectively selecting a different one of said plurality of different points for measuring the distance between said at least one of said first and second marks and the other one of said first and second marks.

26. An apparatus as claimed in claim 24 wherein said data write circuit, said reference mark generator and said issuance mark generator include controller circuitry for selectively setting the distance between said first and second marks and subsequently selectively and programmably changing the selected distance between the two marks and for encoding the information pertaining to the distance and then causing it to be written on the instrument.

27. An apparatus as claimed in claim 24 wherein instrument is one of a card, and a document.

28. An apparatus as claimed in claim 18 wherein said information storage medium is a magnetic stripe and said data reader includes a magnetic reading means.

29. An apparatus as claimed in claim 18 wherein said information storage medium includes a semiconductor memory device and said data reader includes means for reading information from said semiconductor memory device.

30. An apparatus as claimed in claim 18 wherein said instrument is manually inserted in said apparatus.

31. An apparatus as claimed in claim 18 wherein said motorized carriage includes means for moving the instrument through the apparatus at a known rate.

32. An apparatus as claimed in claim 18 wherein said sensor circuit includes an optical reader.

33. An apparatus as claimed in claim 32 wherein said optical reader includes means for reading bar code symbols.

34. An apparatus for encoding an instrument to impede its being counterfeited comprising:
a motor driven carriage for propagating the instrument at a predetermined rate along the apparatus;
means for inserting the instrument to be encoded within the apparatus onto the motor driven carriage;
generator circuitry in said apparatus for locating a first mark on said instrument and for selectively selecting a second mark on said instrument at a location other than said first mark during the time the instrument is propagated within the apparatus; and
a data write circuit for storing in an information storage medium, located within said instrument, information pertaining to the distance between said first and second marks.

35. An apparatus for encoding an instrument to impede its being counterfeited comprising:
means for inserting the instrument to be encoded within the apparatus;
generator circuitry in said apparatus for locating a first mark on said instrument and for selectively producing a second mark on said instrument and for selectively altering at least one of the location and shape of said second mark, when the instrument is within the apparatus, at a programmed distance from said first mark; and
a data write circuit for storing in an information storage medium, located within said instrument, information pertaining to the distance between said first and second marks.

36. An apparatus as claimed in claim 35 wherein said first mark is a reference mark and said second mark is an issuance mark, and wherein said generator circuitry includes a reference mark generator for forming said reference mark on said instrument and an issuance mark generator for forming said issuance mark on said instrument.

37. An apparatus for encoding an instrument as claimed in claim 35 wherein said data write circuit, said reference mark generator and said issuance mark generator include controller circuitry for selectively setting the distance between a reference mark and an issuance mark and for encoding the information pertaining to the distance and then causing it to be written on the instrument.

38. An apparatus as claimed in claim 37 wherein said instrument is a card.

39. An apparatus as claimed in claim 35 wherein said apparatus has an identifying serial number and wherein each instrument encoded in said apparatus is also encoded with information indicative of the serial number of the apparatus.

40. An apparatus as claimed in claim 35 further including:
a data reader for reading information stored in an information storage medium located in said instrument;
a sensor circuit for sensing the location of a first mark present on said instrument and the location of a second mark present on said instrument; and
controller circuitry adapted to receive information from said data reader and from said sensor circuit for comparing the information from said data reader with the information received from said sensor circuit.

41. An apparatus as claimed in claim 40 wherein said instrument includes an information storage medium in which is stored information pertaining to the distance between the first and second marks; and wherein said data reader is designed to sense the information stored in the information storage medium.

42. An apparatus as claimed in claim 41 wherein said first mark is a reference mark and wherein said second mark is an issuance mark and wherein said sensor circuit includes a reference mark sensor for sensing said reference mark and an issuance mark sensor for sensing the location of said issuance mark relative to said reference mark.

43. An apparatus as claimed in claim 42 wherein said instrument is a cash value card.

44. An apparatus as claimed in claim 42 wherein said instrument is a document.

45. An apparatus for encoding an instrument to impede its being counterfeited comprising:
means for inserting said instrument within said apparatus; said instrument having a first mark and having a second mark which includes a plurality of different selectable points;
generator circuitry in said apparatus for locating said first mark on said instrument and for selectively selecting a different one of said different points on said second mark for dynamically defining different distances between said first and second marks while said instrument is within said apparatus; and
a data write circuit for storing in an information storage medium, located in said instrument, information pertaining to the different selected distances between said first and second marks.

46. An apparatus for encoding an instrument to impede its being counterfeited comprising:
means for inserting said instrument within said apparatus; said instrument having a first optical mark and having a second optical mark having a plurality of different selectable points;
generator circuitry in said apparatus for locating said first mark on said instrument and for selectively and programmably selecting a different one of said plurality of different points of said second mark for dynamically defining different distances between said first and second marks while said instrument is within said apparatus; and
a data write circuit in said apparatus for storing in an information storage medium, located in said instrument, information pertaining to the different distances between said first and second marks.

47. An apparatus as claimed in claim 46 wherein said first mark is a reference mark and said second mark is an issuance mark, and wherein said generator circuitry includes a reference mark generator for forming said reference mark on said instrument and an issuance mark generator for forming said issuance mark on said instrument.

48. An apparatus for encoding an instrument as claimed in claim 46 wherein said data write circuit, said reference mark generator and said issuance mark generator include controller circuitry for selectively setting the distance between a reference mark and an issuance mark and for encoding the information pertaining to the distance and then causing it to be written on the instrument.

49. An apparatus as claimed in claim 46 wherein said instrument is a card.

50. An apparatus as claimed in claim 46 wherein said information storage medium is a magnetic stripe.

51. An apparatus as claimed in claim 46 wherein said instrument is manually inserted in said apparatus.

52. An apparatus as claimed in claim 46 wherein said apparatus includes a motorized carriage for carrying an instrument in said apparatus.

53. An apparatus as claimed in claim 52 wherein said motorized carriage includes means for moving the instrument through the apparatus at a known rate.

54. An apparatus as claimed in claim 46 wherein said information storage medium includes a semiconductor memory device.

55. An apparatus comprising:

means for inserting an instrument in said apparatus;

generator circuitry in said apparatus for locating a first mark on said instrument and for selectively producing a second mark on said instrument at a programmed distance from said first mark, and for, subsequently, altering said second mark, when said instrument is inserted in said apparatus;

a data write circuit for storing information pertaining to the distance between said first and second marks in an information storage medium located within said instrument;

a data reader in said apparatus for reading information stored in the information storage medium located in said instrument;

a sensor circuit in said apparatus for sensing the location of the presence of the first mark on said instrument and the location of the presence of the second mark on said instrument; and controller circuitry adapted to receive information from said data reader and from said sensor circuit for comparing the information from said data reader with the information received from said sensor circuit.

56. An apparatus as claimed in claim 55 wherein said apparatus includes:

(a) means responsive to the presence of an instrument within the apparatus and to external commands applied to the apparatus for taking certain actions; and (b) means for modifying the instrument indicative of the action taken and for then encoding the information and storing the information in the information storage medium.

57. An apparatus as claimed in claim 56, wherein said instrument is a cash card and wherein the command to take certain actions includes dispensing cash or cash equivalents in response to the presence of the card and to external commands to dispense; and wherein the apparatus modifies the card to indicate the amount of cash dispensed.

58. An apparatus as claimed in claim 57 wherein the information storage medium is a magnetic stripe.

59. An apparatus as claimed in claim 57 wherein the information storage medium is a semiconductor memory device.

60. An apparatus as claimed in claim 57 wherein said apparatus includes a unique serial number identifying the apparatus and wherein the data write circuit of said apparatus is programmed to encode each instrument passed through the apparatus with information corresponding to the serial number of the apparatus.

61. A method for impeding the falsification of a card having first and second optical marks formed thereon, with the first mark being characterized as having a plurality of different selectable points, comprising the steps of:

selectively selecting a different particular "new" point on said first mark, relative to said second mark, each time the card is used; and determining the new distance between the first and second marks; and encoding the information pertaining to the new distance in an information storage medium located on the card.

62. A method as claimed in claim 61 also including the steps of:

sensing the location of the first and second marks each time the card is used and checking sensed information versus the encoded information.

63. A method for impeding the falsification of a card having first and second optical marks formed thereon, where at least the first mark has a multiplicity of points, and having an information storage medium located on the card for encoding therein the distance between the first and second optical marks comprising the steps of:

selecting a new, different, particular point on said first mark relative to said second mark after each use of the card;

determining the new distance between the new point on said first mark and said second mark; and encoding the information pertaining to the new distance in the information storage medium located on the card.

* * * * *